United States Patent [19]

Lam et al.

[11] Patent Number: 4,589,066
[45] Date of Patent: May 13, 1986

[54] FAULT TOLERANT, FRAME SYNCHRONIZATION FOR MULTIPLE PROCESSOR SYSTEMS

[75] Inventors: Jack F. Lam, Endwell; Hermann Schmid, Binghamton, both of N.Y.

[73] Assignee: General Electric Company, Binghamton, N.Y.

[21] Appl. No.: 615,965

[22] Filed: May 31, 1984

[51] Int. Cl.⁴ .................. G06F 1/04; G06F 11/20
[52] U.S. Cl. .................... 364/200; 371/9; 371/47; 371/61
[58] Field of Search ............... 371/47, 61, 62, 8, 11, 371/9, 36; 375/106, 107, 108, 113, 114, 121; 364/200 MS File, 900 MS File

[56] References Cited

U.S. PATENT DOCUMENTS

| | | | |
|---|---|---|---|
| 3,566,280 | 2/1971 | Emmons et al. | 328/63 |
| 3,602,900 | 8/1971 | Delaigue et al. | 364/200 |
| 3,665,173 | 5/1972 | Bouricius et al. | 371/36 |
| 3,848,116 | 11/1974 | Möder et al. | 371/36 |
| 3,932,847 | 1/1976 | Smith | 364/200 |
| 4,323,966 | 4/1982 | Whiteside et al. | 364/200 |
| 4,375,683 | 3/1983 | Wensley | 371/36 |
| 4,392,199 | 7/1983 | Schmitter et al. | 364/200 |
| 4,404,675 | 9/1983 | Karchevski | 371/47 |
| 4,503,490 | 3/1985 | Thompson | 364/200 |

Primary Examiner—Thomas M. Heckler
Attorney, Agent, or Firm—I. David Blumenfeld

[57] ABSTRACT

The processors in a redundant, multiprocessor system are synchronized at the minor frame level with a combination of hardware and a local software supervisory routine. Each processor includes an interface synchronizer unit which receives synchronizing pulses from a selected number of the processor synchronizer units at the end of each minor frame. Sync decision logic circuits in each synchronizer determine whether the synchronizing pulses arrive within a predetermined time period or "window" (2 usecs, for example) indicating synchronization between the processors. A control, processor "Interrupt", signal is generated whenever a majority (>2) of the four (4) sync signals are received at the end of the minor frame. The local processor then initiates the supervisory software routine, which checks the status of the synchronizer for failure indications, isolates and records the faulty sync pulses and then replaces any faulty processor with another processor.

8 Claims, 5 Drawing Figures

FAULT TOLERANT, FRAME SYNCHRONIZATION FOR MULTIPLE PROCESSOR SYSTEMS

BACKGROUND OF THE INVENTION

This invention relates to redundant computer systems with multiple processors and means for synchronizing the processors during each processor minor frame.

Redundant computer systems utilizing multiple, reconfigurable, processing modules are required and necessary in fault-tolerant control systems such as those used in digital flight control systems, for example. Where reconfigurable multiprocessor systems are utilized, synchronization is needed to force the operation of individual processors—and, more specifically, the start of each iteration or minor frame—to coincide in time. Such synchronization has previously been attempted at the computer clock level, and at the major frame level, i.e., the interval during which the processors execute their entire program.

The instant invention relates to an arrangement for synchronizing a multiprocessor system at the minor frame level (with a major frame being defined as an integral number of minor frames) by a combination of hardware and software.

SUMMARY OF THE INVENTION

Synchronization is initiated in response to a status word generated in the interface unit associated with each processor at the end of each minor frame. The status word from each processor interface unit is transmitted over existing dedicated interprocessor buses to the synchronizer circuits in each of the other interface units to generate sync pulses. In an eight (8) processor channel only four (4) of the sync pules are used to determine whether pulses arrive in the two microseconds (2 us) "time window".

The synchronizer hardware produces a control signal in the form of a processor Interrupt signal at the end of each minor frame to initiate the supervisory software routine. The Interrupt signal is produced if two or more of the four (4) pulses arrive within the "time window", regardless if the other pulses arrive earlier or later than the majority. The supervisory software routine identifies any sync pulse failures—the processor associated with the failed sync pulse—and substitutes processors if the sync failure indication is less than three.

Synchronization by a combination of hardware and software has the advantage that very little additional hardware is required, the time "skew" between processors is very small, the circuits detect not only timing but also bus/transmitter faults, and the arrangement requires no additional lines between the modules to be synchronized.

It is therefore an objective of the invention to provide a fault-tolerant computer including a plurality of redundant processors which are readily synchronized at the frame level.

Another objective of the invention is to provide synchronization of a multiprocessor system by means of a combination of synchronization logic hardware and supervisory software.

Still another objective of the invention is to provide a synchronization system for a fault-tolerant, multiprocessor computer control system which is highly effective and not subject to single fault.

Other objectives and advantages of the invention will be realized as the description thereof proceeds.

The synchronization system of the invention is characterized by a hardware-software system in which the operation of multiple processing modules is synchronized in real time.

The software supervisory routine determines which of the sync pulses and their associated processors are out of sync and replaces each out-of-tolerance processor with one of the remaining processors.

The software routine is capable of resolving any ambiguity in the situation where the sync pulses fail in pairs and it is uncertain whether one pair is early or one pair is late. The ambiguity is resolved by replacement of one processor and pulse in each pair so that the ambiguity may be resolved in no more than three minor frames.

Other features believed characteristic of this invention are set forth with particularity in the appending claims. The invention itself, however, together with other objectives and advantages thereof, will be best understood by reference to the following description taken in conjunction with the accompanying drawings in which:

DESCRIPTION OF THE PREFERRED EMBODIMENT

Each of the processors includes a Bus Interface Unit for interprocessor communication and synchronization at the end of each processor minor frame. The interface units are interconnected by dedicated buses from all processors in the multiprocessor channel. A predetermined number of the total sync pulses (as, for example, four out of eight) are applied to the synchronization circuit in the bus interface unit. The synchronization logic determines whether the synchronizing pulses are received within a given "time window" (such as two microseconds, for example), which is considered synchronization in real time.

The synchronization circuit in each interface unit generates an Interrupt pulse, which initiates the software supervisory routine, whenever either one of the following events takes place during each minor frame synchronization sequence:

a. All four sync pulses have been received.
  b. At least one sync pulse does not arrive within the predetermined two-microsecond "time window".

Figure 1:
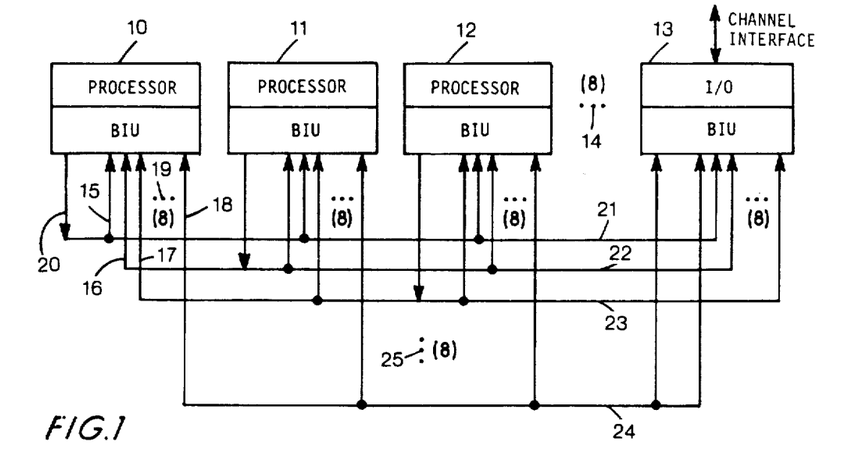
FIG. 1 is a block diagram of a multiprocessor channel showing the processor, the bus interface units and the dedicated buses connected between the interface units to supply synchronizing pulses.

FIG. 1 shows a block diagram of a redundant multiprocessor channel having eight processing and/or I/O modules, each with its bus interface unit. Four processors and bus interface units are shown as 10, 11, 12, and 13, with the remaining four (4) being represented by the dots 14. The bus interface units associated with these modules have eight (8) input lines and an output line 20. Four (4) of the input lines are shown at 15, 16, 17, and 18, with the remaining four (4) being shown by the dots.

The bus interface units are interconnected by eight (8) dedicated serial data buses 21, 22, 23 and 24, with the remaining four being shown by the dots 25. Thus output line 20 from each Bus Interface Unit is applied to its own bus interface unit over line 15 and to the bus interface units of the remaining seven modules over the dedicated buses 21-24. Thus in the eight-channel system shown in FIG. 1, the bus interface unit receives eight (8) status word/sync signals at the end of each minor frame, four of which are connected to the synchronization hardware logic to ascertain whether the processors are in synchronism.

In order to understand fully the manner in which the bus interface synchronizer and the supervisory software routine of the processor interact to maintain real time synchronism within a two-microsecond "time window", it will be useful to review what are in effect the operational laws of the bus interface unit hardware and the software supervisory routine. Thus, 1. If the processors come to the end of one minor frame and initiate the next minor frame within two microseconds, they are considered synchronized.
2. A maximum system "skew" of 5-6 microseconds between processors is permitted.
3. An early sync pulse does not initiate the supervisory routine; i.e., a single "early" pulse failure is detected and corrected only at the end of minor frame synchronization.
4. The software supervisory routine is always initiated when all four sync pulses are received in the "time window".
5. If two sync pulses fail, indicating two processors are out of sync, the supervisory software routine replaces the out of sync processors with good ones.
6. If the two pulse failure represents an ambiguous situation, i.e., one in which two pulses could be too "early" or two pulses could be too "late", the ambiguity is resolved by replacing one pulse and processor in each pair during the next minor frame to determine which pair was in error. During the third minor frame, the routine then substitutes the remaining one of erroneous pair.
7. Failure of the same two sync pulses during successive minor frames, after processors have been substituted, indicates the bus interface unit and its synchronizer are faulty. It and its associated processor are then removed.
8. Any indication that three processors are out of sync represents a synchronizer and interface unit hardware failure causing removal of that processor from operation.

For the sake of simplicity, the term minor frame is used to mean an interval during which at least some part of the program is executed; i.e., one of the repetitive computational intervals. The processor, in executing its program, usually executes certain instructions every minor frame, some instructions every other or once every several minor frames, and some once every major frame. While a minor frame of 6.25 milliseconds and a major frame of 100 milliseconds (i.e., 16 minor frames) is, for the sake of convenience, used in the description of the invention, it will be obvious that the invention is by no means so limited and the duration of a minor frame, the number of minor frames in a major frame, and the time duration of the major frame may be varied to suit the particular application. Similarly, the use of a "time window" of two (2) microseconds to define minor frame synchronism merely exemplifies one application and that other "time window" intervals may be used.

With a 6.25 millisecond minor frame interval, and a two (2) microsecond "time window" between pulses, the maximum system "skew" is just under six (6) microseconds. That is, if each of the last three (3) pulses arrives 1.9 microseconds after the preceding one, the system is considered in synchronism. But the total interval or "skew" between the four (4) sync pulses is just under six (6) microseconds. However, even with a maximum "skew" of just under six (6) microseconds and a minor time frame of 6.25 milliseconds, the accuracy of the synchronization, in this worst case, is within one-tenth of one percent of the minor frame period.

Figure 2:
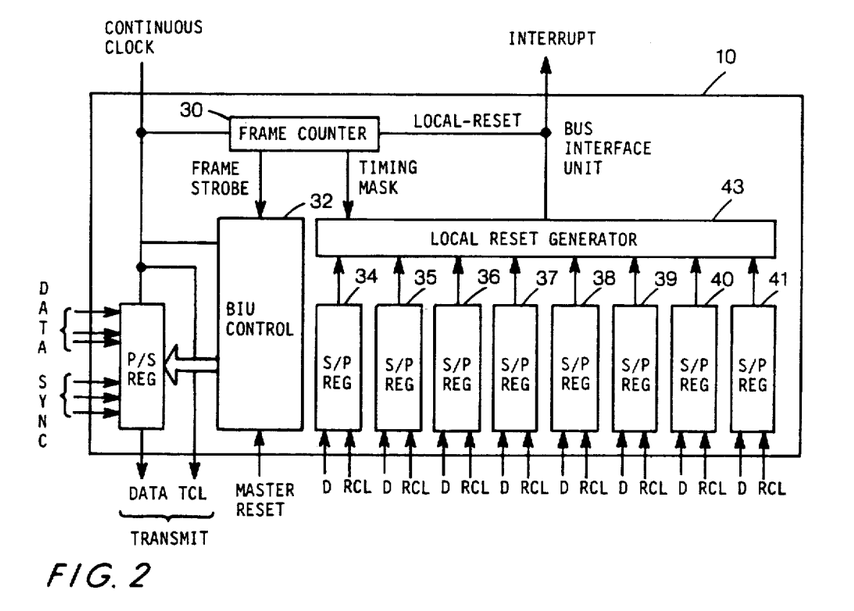
FIG. 2 illustrates a block diagram of one of the bus interfaces units shown in FIG. 1.

FIG. 2 is a block diagram of a bus interface unit (BIU) shown in FIG. 1. The bus interface unit includes a programmable frame counter 30 which generates the 6.25 millisecond minor frame time interval. At the end of each 6.25 millisecond minor frame count, frame counter 30 generates a "frame strobe" pulse which is applied to BIU control circuit 32. BIU control circuit 32 generates a status word and a sync pulse in response to the "status word". All the other processor/BIUs operate in the same manner to generate sync pulses. Sync pulses from all of the processors are received in data networks 34-41. A selecting or multiplexing circuit, not shown, selects four of the eight sync pulses for application to the synchronizer.

The selected sync pulses are applied to a local reset generator 43. Generator 43 includes sync pulse decision logic hardware which determines whether the sync pulses arrive during the "time window" and stores that information. The local sync pulse decision logic actuates a pulse generator to produce the processor Interrupt pulse. This initiates the software supervisory routine from the processor which determines the synchronizer status to see if there has been a failure, identifies any failed pulse and processor, and removes the failed sync pulse and processor.

A reset pulse is generated one microsecond after the Interrupt pulse. The reset pulse is applied to frame counter 30 to initiate the new minor frame count one microsecond after the Interrupt pulse initiates the software service routine.

The local reset generator 43 contains ONE OUT OF FOUR, TWO OUT OF FOUR, THREE OUT OF FOUR, and FOUR OUT OF FOUR synchronizer decision logic circuits to generate the processor Interrupt pulse upon appearance of all four pulses, or if the TWO OUT OF FOUR or THREE OUT OF FOUR circuits time out; i.e., if one or more of the remaining sync pulses are separated by an interval greater than the two microsecond "time window". Information about the states of the logic circuits and the identity of the sync pulses which have or have not arrived in the "time window" is stored in a buffer storage means. The buffer element is interrogated during the supervisory software routine to identify any failed sync pulse and to permit removal of the failed pulse or pulses and their associated processors.

The invention is by no means limited to an eight (8) channel processor in which four (4) sync pulses are utilized for minor frame synchronization. More generally, in a system using N sync pulses, the synchronizer will contain ONE OUT OF N, TWO OUT OF N, . . . N OUT OF N decision logic circuits to generate the INTERRUPT signal whenever N OUT OF N pulses have arrived or if any but the ONE OUT OF N logic circuits indicates a pulse separation greater than the 2 microsecond "time window".

Generation of an Interrupt signal also freezes the synchronizer circuit to inhibit any further external input, such as sync or clock pulses, to the synchronizer hardware so that the processor can examine the health of the circuit during the supervisory routine. At the end of the supervisory routine the processor resets the synchronizer hardware to prepare it for the next minor frame synchronization, Interrupt and supervisory routine sequence.

Figures 3, 3A:
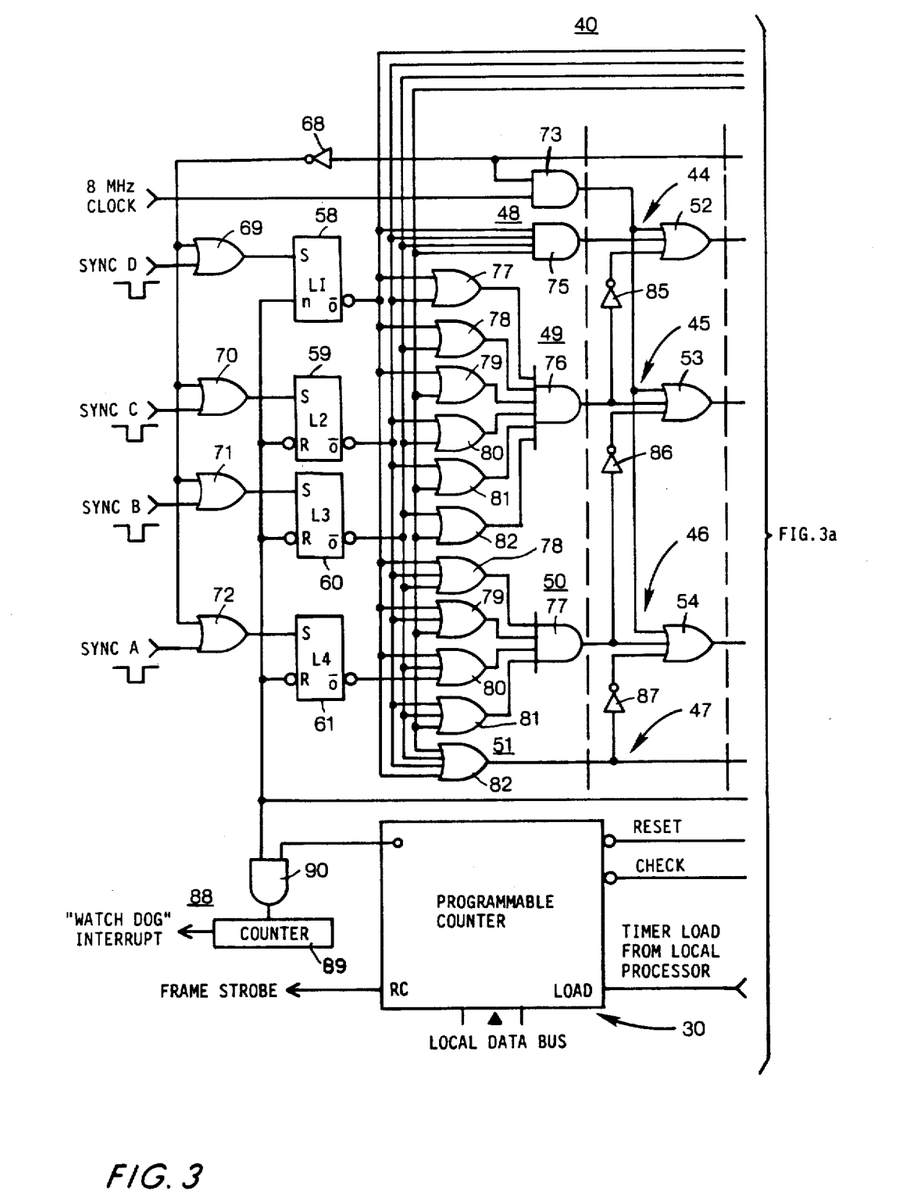
FIGS. 3 and 3a show the synchronizing hardware in the BIU with the activating logic which produces the Interrupt signals, etc.
Figure 3A:
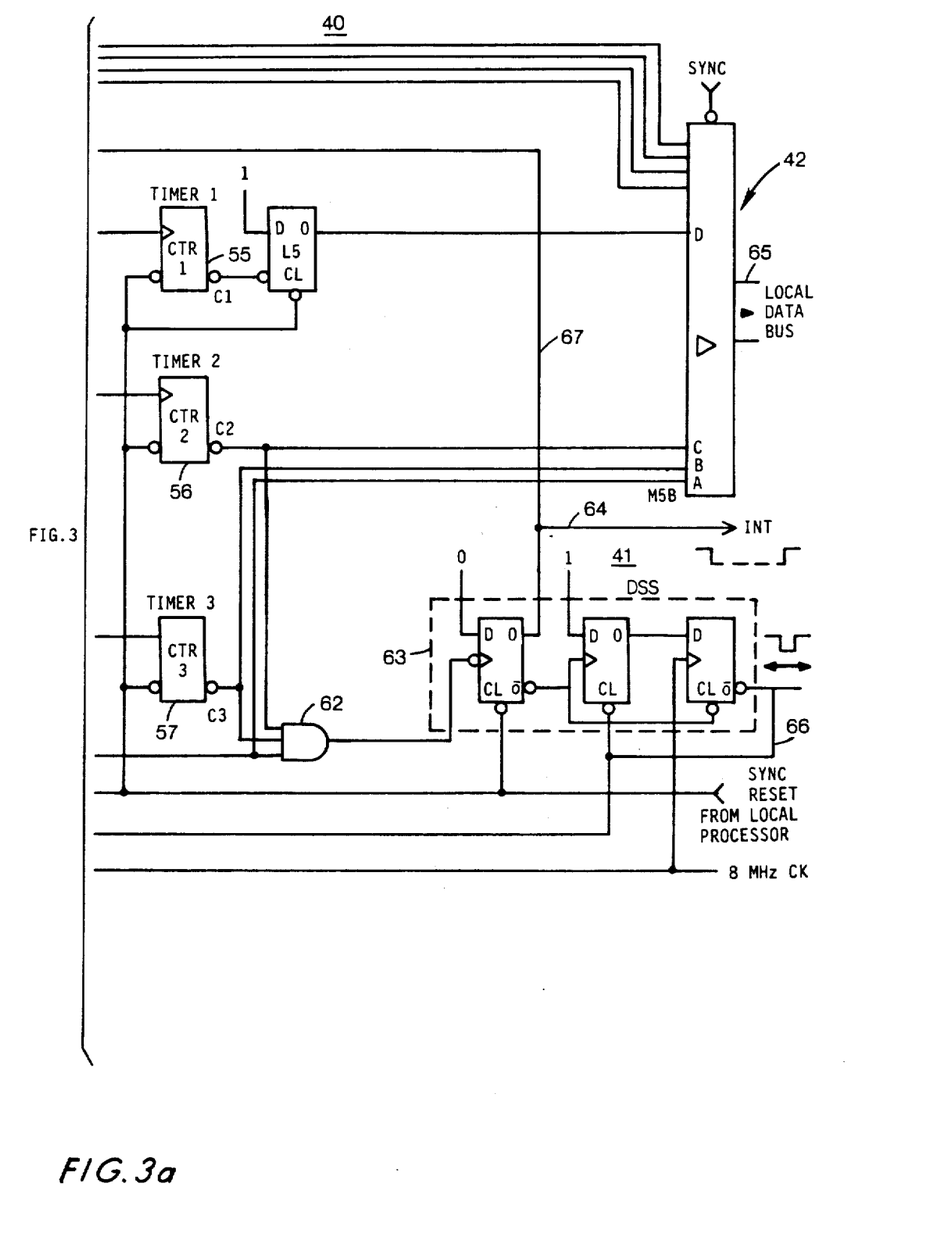

FIGS. 3 and 3a show the local reset generator 43 to include an Interrupt pulse generator 41, a status buffer 42 which stores information on the status of the synchronizer, the ONE OUT OF FOUR path 44, TWO OUT OF FOUR path 45, THREE OUT OF FOUR path 46 and FOUR OUT OF FOUR path 47, the outputs of which are connected to Buffer 42. Logic decision circuits 48–51 in paths 44, 45 and 46 are coupled through timer control OR gates 52–54 to timers 55–57. The logic decision networks are controlled from quad input latches 58–61 which are set in response to the sync input pulses.

Status buffer 42 is also coupled to the quad latches 58–61 and registers the status of these quad latches so that the identity of any failed sync pulse (and its associated processor) may be readily determined during the software supervisory routine.

The outputs from each of the sync pulse paths, except for ONE OUT OF FOUR path 44, are connected to Interrupt Pulse Generator 41 through an Interrupt Pulse AND gate 62. AND gate 62 actuates the Interrupt generator 41 (which takes the form of a Digital Single Shot 63) to produce an Interrupt pulse. The Interrupt pulse on line 64 is applied to the local processor to initiate the software supervisory routine. The appearance of the negative going Interrupt pulse also causes the processor to generate a Status Buffer Enable pulse which allows the information stored in Status Buffer 42 to be retrieved over data bus 65 during the supervisory routine.

Digital Single Shot 63 generates a reset pulse one (1) microsecond after the Interrupt pulse. The reset pulse is applied over line 66 to reset Digital Single Shot 63 and to the reset terminal of counter 30 to initiate the next minor frame interval.

The Interrupt pulse is also applied over lead 67 and inverting amplifier 68 to the inputs of the quad latch OR gates 69–72 to freeze the input to the quad latches and to block further sync input pulses to the latches. The Interrupt pulse on line 67 also disables clock pulse AND gate 73 to block clock pulses from timing counters 55–57.

The decision logic in the ONE OUT OF FOUR path actuates counter 55 on receipt of any sync pulse. Counter 55 is disabled by the TWO OUT OF FOUR path if another pulse arrives in the two (2) microsecond "time window". If counter 55 counts out because a 2nd pulse does not arrive within 2 usecs, a latch set signal is generated for STATUS BUFFER 42.

The decision logic in the TWO OUT OF FOUR path is actuated on receipt of any combination of two sync pulses to initiate the two (2) microsecond count. Counter 56 is disabled by the THREE OUT OF FOUR path if a 3rd pulse arrives within a two microsecond "time window" after the 2nd pulse. Counter 56 times out if a 3rd pulse does not arrive within 2 usecs after the 2nd pulse and actuates Interrupt pulse generator 41 to initiate the supervisory software routine. This information is stored in STATUS BUFFER 42.

Upon receipt of any combination of three pulses, the THREE OUT OF FOUR path is actuated and counter 57 begins its count. Counter 57 is disabled by the FOUR OUT OF FOUR path if the 4th pulse arrives in two microsecond "time window", i.e., before counter 57 counts out. If the 4th pulse does not arrive, an INTERRUPT pulse is generated. If counter 57 counts out, that information is stored in STATUS BUFFER 42.

The FOUR OUT OF FOUR path is activated if all four (4) pulses are received in the "time window", to generate the INTERRUPT pulse. The status of this path is stored in STATUS BUFFER 42.

Quad Input Latches

Input latches 58–61 are acutated in response to the negative going sync pulses A-D. The output from the latches are connected to the decision logic circuits in paths 44–47 which operate on negative logic. The inputs to the decision logic circuits are connected to the inverted, or NOT ZERO, output terminals of the latches. Thus, in the absence of a sync pulse, the NOT ZERO terminals of the latches are in the logic ONE state. Sync pulses set the latches so that the output from the NOT ZERO terminal goes to ZERO.

Sync pulses A, B, C and D are applied to one input of OR gates 69–72. The other input to each OR gate is coupled through line 67 and inverter 68 to Interrupt signal generator 41. In the absence of an Interrupt signal, one input to each gate is at logic ZERO. The appearance of negative going sync pulse causes both inputs to go to ZERO and the output of the OR gate goes to ZERO, setting the associated latch and causing the output from the NOT ZERO terminal to go from ONE to ZERO.

Decision Logic Circuits

The Boolean equations for decision logic circuits 48–51 responding to sync pulses A, B, C, and D are as follows:

ONE OUT OF FOUR = A + B + C + D.

(actuated in response to appearance of any sync signal)

TWO OUT OF FOUR = (AB) + (AC) + (AD) + (BC) + (BD) + (CD).

(actuated in response to any combination of two sync signals)

THREE OUT OF FOUR = (ABC) + (ABD) + (ACD) + (BCD)

(actuated in response to any combination of three sync signals)

FOUR OUT OF FOUR = ABCD.

(actuated in response to all four sync signals)

ONE OUT OF FOUR

The ONE OUT OF FOUR sync decision logic 48 is mechanized in the form of a four input AND gate 75 connected to the NOT ZERO terminals of latches 58–61. In the absence of sync pulses, the outputs of all the latches are ONE and the AND gate output is ONE. As soon as any sync pulse arrives, its associated latch is set and the NOT ZERO terminal goes to ZERO. All the inputs to AND gate 75 are no longer ONE and the output of AND gate 75 goes to ZERO.

TWO OUT OF FOUR

Decision logic circuit 49 in TWO OUT OF FOUR path 45 includes a six input AND gate 76 connected to OR gates 77-82. The inputs of OR gates 77-82 are connected to latches 58-61. The inputs to the individual OR gates represent the six possible combinations of the four sync pulses. In the absence of two (2) sync pulses, the outputs from all the OR gates is ONE and the output from AND gate 76 is also ONE. Whenever any combination of two sync pulses appears, the output from one of OR gates 77-82 goes to ZERO. As a result, one input to AND gate 76 goes to ZERO and its output goes to ZERO.

THREE OUT OF FOUR

Decision logic circuit 50 in the THREE OUT OF FOUR path includes a four input AND gate 77 connected to OR gates 78-81 which represent all possible combinations of three sync pulses. Any combination of three pulses causes the output of one of these OR gates to go to ZERO driving the output of AND gate 77 to ZERO.

FOUR OUT OF FOUR

The FOUR OUT OF FOUR decision logic is a four input OR gate 82 having inputs from all four of the latches. The output of OR gate 82 is ONE until all four inputs to the OR gate go to ZERO, a condition possible only if all four sync pulses have arrived.

COUNTER CONTROL OR GATES

The decision logic circuits control OR gates 52-54 through which the clock pulses for the counters must pass. Whenever the Boolean equation is satisfied for each of the decision logic circuits, its output changes enabling the three input control OR gates in the ONE, TWO and THREE OUT OF FOUR paths and clock pulses from AND gate 73 are applied to the counters which begin to count. If the other sync pulses do not arrive within the 2 microsecond "window", the counter counts out and the output from counters 56 and 57 initiate the Interrupt pulse. If, however, the other pulses arrive within the time period, inverting amplifiers 85, 86 and 87 connected between the outputs of the logic decision circuits in the next higher path, i.e., AND gates 76, 77 and OR gate 82 disable OR gates 52-54 and block further clock pulses from the counters.

INTERRUPT PULSE GENERATOR

Timing out of counter 56 or 57 or the change of state of OR gate 82, indicating that at least three (3) pulses have arrived in the 2 usec. window, results in one input to AND gate 62 going to a logic ZERO state causing its output to trigger Digital Single Shot 63 to produce the negative going local processor Interrupt pulse. The output states of the counters and OR gate 62 is stored in buffer 42. The Interrupt pulse initiates operation of the software supervisory routine which identifies the status of the sync circuits and identifies any sync pulses which are out of sync. One (1) microsecond after the Interrupt pulse, a reset pulse is generated by the Digital Single Shot. This pulse resets programmable counter 30 and initiates the start of the next minor frame count. The reset pulse also resets Digital Single Shot 63 preparing it for operation of the next synchronizing sequence

Watchdog Circuit

A watchdog (override) circuit 88 is provided to generate an Interrupt pulse in the event that any synchronizer circuit indicates that three of the four sync pulses have not arrived; i.e., the TWO, THREE and FOUR OUT OF FOUR paths are not actuated, since this is an indication that the synchronizer is faulty and not that three processors are out of sync. This requires that synchronizer and its associated processor be removed. In the sync circuit mechanization shown in FIG. 3, no Interrupt pulse is generated if three sync pulses are missing because the decision logic circuits in the TWO, THREE and FOUR OUT OF FOUR paths will disable the clock pulse OR gates. The watchdog circuit which has an internal clock and counter, generates an Interrupt pulse if it is allowed to count for an interval larger than the minor frame (viz, 9 milliseconds vs. the 6.25 millisecond minor frame interval). The watchdog circuit includes counter 89 which has a counting period larger than the minor frame interval. The counter is coupled through the AND gate 90 to the programmable counter and the sync reset pulse line from the local processor. Thus, if an Interrupt pulse is generated by the synchronizing circuit at the end of a minor frame, the watchdog circuit counter is reset each time programmable counter 30 begins its minor frame count.

If, however, the synchronizer is faulty so that no Interrupt pulse is generated and no sync reset pulse is received from the processor, the watchdog counter continues counting because it is not reset. At some time after a minor frame interval, the watchdog counter counts out and generates an Interrupt signal for the local processor which then initiates the software supervisory routine. During the software supervisory routine it is noted that three pulses have not arrived indicating a faulty synchronizer and the software routine then turns off the local processor and removes it from operation.

The output lines from Quad latches 58-61 are also connected to a four (4) bit latch which is set from counter 55 in the ONE OUT OF FOUR path. The four outputs from this latch are connected to Status Data Buffer 42. If one sync pulse is early, counter 55 counts out, setting the four (4) bit latch and identifying which of Quad latches 58-61 has been set, i.e., which sync pulse has arrived more than 2 microseconds early. The software supervisory routine checks Status Buffer 42 to identify any early pulse if Data Buffer inputs A or B are set.

Supervisory Routine Flow Diagram

Figure 4:
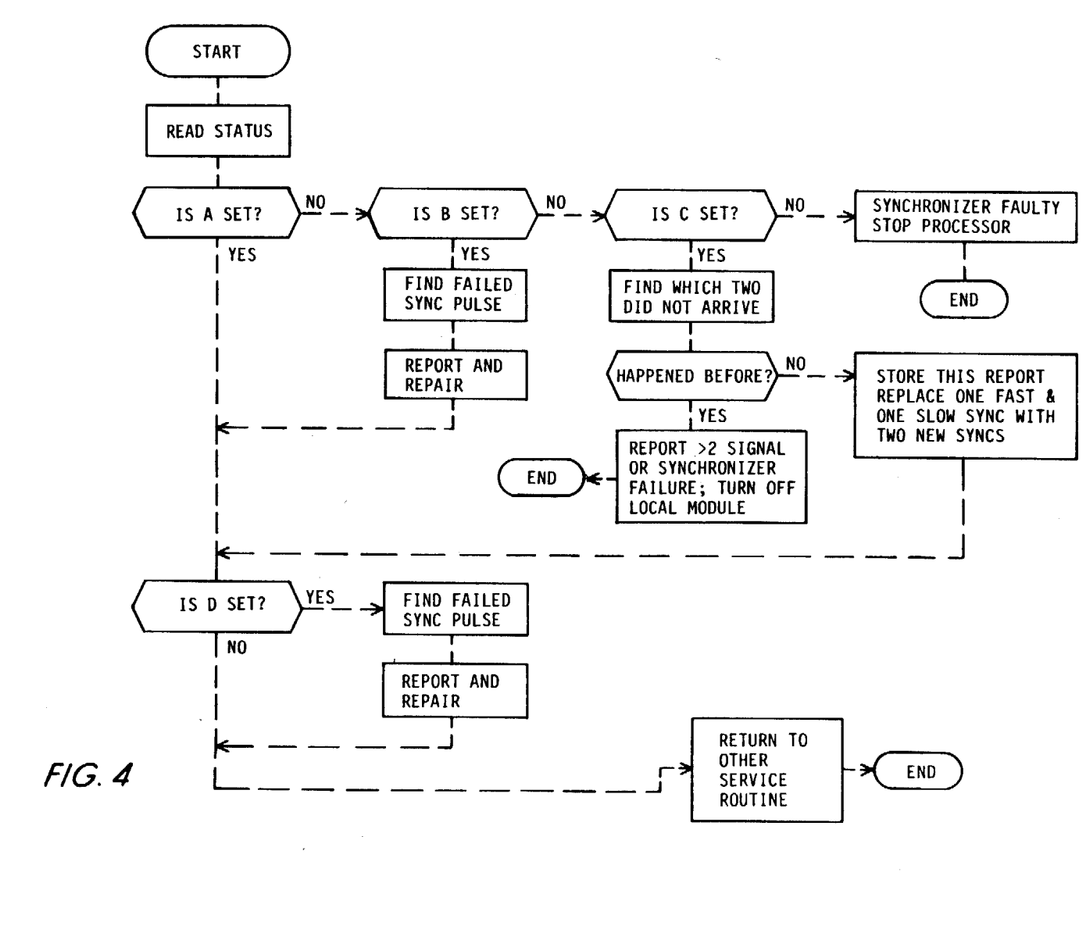
FIG. 4 shows a flow diagram of the software supervisory routine for the Bus Interface Units.

FIG. 4 shows a flow diagram of the Interrupt service routine initiated at the end of each minor frame. Upon generation of the Interrupt signal, the supervisory software begins its program by transmitting a sync pulse to data buffer 42 to permit status data to be read out over data bus terminals 65 to determine which sync pulses and processors may have failed. The service routine first determines whether the data buffer input A associated with the FOUR OUT OF FOUR path is set, indicating that the Interrupt pulse was generated here. If it is set, meaning the Interrupt came from the FOUR OUT OF FOUR path, this indicates that the counters in the TWO and THREE OUT OF FOUR paths have not counted out.. If the second and third pulses had not arrived within the "time window", either counter 56 or 57 would have counted out generating an Interrupt pulse, freezing the latch control gates and preventing the fourth pulse from being received. Thus, if the data buffer input A associated with the FOUR OUT OF FOUR is set, that is an indication that all four pulses have been received. The supervisory routine then interrogates the buffer to determine whether data buffer input D associated with the ONE OUT OF FOUR counter 55 is set because, as pointed out previously, the system is tolerant to one fault, so that one "early" sync pulse does not generate an Interrupt pulse. If counter 55 counts out this information, it is simply stored in buffer 42 to indicate the failure. Thus if D is not set, then it is apparent that all the processors are in sync and the supervisory routine is returned to any other service routines that may be incorporated and is then ended.

If, however, data buffer input D is set, the supervisory routine determines which of the sync pulses was early. Having identified the "early" sync pulse, that information is noted and the system is repaired by replacing that sync pulse and its associated processor with one of the remaining four processors during the next minor frame.

If, however, it is noted that data input A is not set, indicating that a fourth pulse has not arrived because an INTERRUPT pulse has been generated prior to the arrival of the fourth sync pulse, the data buffer is interrogated to identify which sync pulse or pulses have failed to arrive within the "time window". If the counter in the THREE OUT OF FOUR path has timed out because one pulse is "late", data bus input B would be set. The data buffer is interrogated to determine which of the quad latch input networks is still in the logic ONE state indicating that its associated pulse has not arrived. This condition is then reported and the circuit repaired by removing the sync pulse and associated processor and replacing it with a good processor; i.e., one in sync. The circuit is further interrogted to determine whether data buffer input D is set or not and the sequence continued. That is, if D is set indicating that the counter in ONE OUT OF FOUR path has counted out, it shows a two pulse failure condition in which one pulse is "early" and one pulse is "late". The "early" pulse is identified and replaced and the routine continues to the end.

If data buffer input B is not set, then data buffer input C associated with the counter in TWO OUT OF FOUR path is interrogated. If C is set, this shows a two sync pulse failure in which two pulses did not arrive. The missing sync pulses are identified from the state of their associated latches and this information is stored in the processor.

A two pulse failure in which two pulses did not arrive is ambiguous in the sense that it is not certain whether two pulses arrived "early" or two pulses arrived "late". The supervisory software routine is designed to determine and correct such a situation. If the identified situation has not occurred before, one processor associated respectively with the "early" pair and one with the "late" pair is replaced. At the end of the next minor frame, the remaining one of the two processors in one of the pairs will be out of sync, thus indicating whether one pair is "late" or one pair is "early". The remaining faulty processor is replaced in the next iteration, thus curing the system within three minor frames. However, if the supervisory routine shows that this failure pattern has occurred before, then the conclusion is that either the synchronizers or the associated processors are faulty and are immediately removed from operation and replaced with two healthy and in-sync processors.

If the INTERRUPT signal has been initiated by watchdog monitor 88, the supervisory routine will show that data buffer input C associated with the TWO OUT OF FOUR path is not set, indicating that the synchronizer is faulty and the associated processor is removed.

Typical Operation

The counters in the synchronization paths, which are 16-bit counters operated from 8 MHz clock pulses, generate a "time window" of two (2) microseconds; i.e., they will count out after 2 usecs. Counter 55 begins its count when the first sync pulse arrives and the ONE OUT OF FOUR sync decision logic AND gate 75 goes to the logic ZERO state enabling OR gate 52 to pass clock pulses from AND gates 73 to the counter. If a second sync pulse arrives within the two microsecond "time window", the TWO OUT OF FOUR logic will disable counter 55 because inverting amplifier 85 disables OR gate 52 and blocks clock pulses for counter 55.

If a third sync pulse does not arrive within two microseconds of the second, counter 56 times out and its output goes to ZERO. This causes the output of AND gate 62 to go to ZERO and triggers Digital Single Shot 63. If the third sync pulse arrives within the two microsecond "window", the THREE OUT OF FOUR decision logic circuit as represented by AND gate 77 will disable counter 56 because inverting amplifier 76 will block control OR gate 53.

When the output of AND gate 77 in the THREE OUT OF FOUR path goes to ZERO, or gate 54 is enabled and counter 57 in that path begins to count. If the fourth sync pulse does not arrive within two microseconds, counter 57 counts out and generates an Interrupt pulse thorugh AND gate 62 and Digital Single Shot 63. If the fourth pulse arrives within two microseconds, OR gate 82 in the FOUR OUT OF FOUR logic path changes state and disables OR gate 54 through inverting amplifier 87. However, the arrival of the fourth pulse within the "time window" itself generates Interrupt pulse by actuating AND gate 62 to trigger Digital Single Shot 58. In summary, an Interrupt pulse is generated either if the counter in the TWO, or THREE OUT OF FOUR paths count out, or if the output of the FOUR OUT OF FOUR logic decision circuit goes to the logic ZERO state.

Any of these Interrupt signals then initiate the minor frame Interrupt software service routine which then checks the status of the synchronizer and the individual sync pulses by interrogating the data stored in sync circuit buffer 54.

It will be apparent from the foregoing that the instant invention constitutes a highly flexible, fault-tolerant multiprocessor synchronizing system. Synchronization at the minor frame level is provided through a combination of hardware and a local software supervisory routine.

While a particular embodiment of this invention has been shown, it will be understood that the invention is by no means limited thereto since many modifications, both in the structural arrangement, the instrumentalities employed and the supervisory software routines utilized, may be made. It is contemplated by the appended claims to cover any such modification as fall within the true spirit and scope of this invention.

What is claimed as new and desired to be secured by U.S. Letters Patent is:

1. In a multiprocessor system synchronized at specific repetitive processor computational time frame periods, the combination of:
   (a) a plurality of processors, only a portion of which perform computational activities at a given time,
   (b) means associated with each processor for generating a synchronizing pulse at the end of each processor minor frame period, and transmitting said pulse over existing interprocessor communication lines to its own and all other processors,
   (c) synchronizing means for each processor for receiving pulses from its own and all other processor synchronizing pulse means and selecting a lesser portion (N) of said received pulses for use in synchronization,
   (d) synchronizing pulse logic circuitry associated with each synchronizing means for determining whether a majority of the selected synchronizing pulses are received within a predetermined time interval, including means to determine the selected arrival of each one of the selected synchronizing pulses within said interval,
   (e) means coupled to each of the said synchronizing pulse logic circuitry for storing error status information about each of the selected synchronizing pulses,
   (f) means for generating a control signal in response to the state of the synchronizing pulse logic circuitry if all of the selected synchronizing pulses arrive within the predetermined interval and if more than one of the selected synchronizing pulses fails to arrive within said interval,
   (g) means for coupling said control signal to its own processor to initiate a supervisory software routine which:
      (1) interrogates said storage means for the arrival status of the selected synchronizing pulses,
      (2) identifies any failed selected synchronizing pulse, or pulses and the processor associated therewith
      (3) replaces out of synchronism processors.

2. The multiprocessor system according to claim 1 wherein said supervisory software routine for status interrogation of said storage means sequentially determines whether:
   (a) all selected synchronizing pulses have arrived and thereafter if one pulse was early by more than said interval,
   (b) all selected synchronizing pulses but one have arrived in said interval,
   (c) all selected synchronizing pulses but two have arrived in said interval.

3. The multiprocessor system according to claim 2, wherein failure of two selected synchronizing pulses to arrive, is followed by replacement of one processor associated with the non-arriving pulses and one processor associated with the arrived pulses whereby the remaining out of synchronization processor can be identified and removed during the next processor computational time frame synchronizing sequence.

4. The multiprocessor system according to claim 1 wherein the synchronizing pulse decision logic circuitry contains separate paths actuated respectively in response to the arrival of 1 out of N, 2 out of N . . . and N of N synchronizing pulses within the said time interval, said control signal being generated in response to all paths but the 1 out of N path, each pulse path, except the N out of N path, being disabled by a next higher pulse path if said next higher pulse path received its respective pulses.

5. The multiprocessor system according to claim 4 wherein each decision logic path but the N of N path contains timing means, each of said timing means initiating said predetermined time interval upon receipt of a proper number of pulses for said path, said timing means being disabled if a next higher pulse path is actuated by the arrival of the number of pulses required to actuate the timing means in that next path, said timing means in said decision logic paths timing out to generate the control signal if not disabled.

6. A multiprocessor system according to claim 1 wherein said means for generating said control signal is not actuated if one selected synchronizing pulse arrives before all the others by a time interval greater than the predetermined interval.

7. A multiprocessor system according to claim 1 wherein said means for generating said control signal is not actuated if one selected synchronizing pulse arrives before all the others by a time interval greater than the predetermined interval, but is actuated if one selected synchronizing pulse arrives after all the others by a time interval greater than the predetermined interval.

8. A multiprocessor system in which the operation of each processor in the system is coordinated in time, generally at the boundaries of repetitive computational intervals called "frames", in which each processor includes:
   (a) an internal timing generator to initiate the repetitive computational frames,
   (b) circuit means for generating a synchronizing signal at the frame boundary and transmitting it to its own and all other processors in the system over existing interprocessor communication lines;
   (c) a circuit for receiving the synchronizing signals to initiate the next computational time frame by resynchronizing the internal timing generator and the processor, said circuit actuating the said timing generator to initiate the next computational frame when a majority of valid synchronizing signals has been received from all other active processors.

* * * * *